US010803196B2

(12) United States Patent
Bodegas Martinez et al.

(10) Patent No.: US 10,803,196 B2
(45) Date of Patent: Oct. 13, 2020

(54) ON-DEMAND DE-IDENTIFICATION OF DATA IN COMPUTER STORAGE SYSTEMS (71) Applicant: Microsoft Technology Licensing, LLC, Redmond, WA (US)

(72) Inventors: Gerardo Bodegas Martinez, Kirkland, WA (US); Alexandro Olivares Acosta, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 242 days.

(21) Appl. No.: 15/942,268

(22) Filed: Mar. 30, 2018

(65) Prior Publication Data
US 2019/0303610 A1  Oct. 3, 2019

(51) Int. Cl.
G06F 21/62  (2013.01)
G06F 16/11  (2019.01)
G06F 16/14  (2019.01)
G06F 16/16  (2019.01)
G06F 16/23  (2019.01)
(Continued)

(52) U.S. Cl.
CPC ........ G06F 21/6245 (2013.01); G06F 16/125 (2019.01); G06F 16/152 (2019.01); G06F 16/162 (2019.01); G06F 16/2379 (2019.01); G06F 16/2456 (2019.01); G06F 21/6254 (2013.01); G06F 7/58 (2013.01)

(58) Field of Classification Search
CPC .............. G06F 21/6245; G06F 16/162; G06F 16/2379; G06F 16/125; G06F 16/2456; G06F 16/152; G06F 21/6254; G06F 7/58
See application file for complete search history.

(56) References Cited

U.S. PATENT DOCUMENTS 7,865,376 B2   1/2011  Ober et al.
8,275,850 B2   9/2012  Kohan et al.
8,326,849 B2  12/2012  El Emam et al.
(Continued)

OTHER PUBLICATIONS

"DOT-Anonymizer—a Multi-platform data masking tool", Retrieved From: https://web.archive.org/web/20170930045246/https:/arcadsoftware.com/products/dot-anonymizer-a-multi-plafform-data-masking-tool/, Sep. 30, 2017, 7 Pages.
(Continued)

Primary Examiner — Ayoub Alata
(74) Attorney, Agent, or Firm — Liang IP, PLLC (57) ABSTRACT Computing devices for on-demand de-identification of data in computer storage systems are disclosed herein. In one embodiment, a server can include a process and a memory containing instructions configured to receive an electronic message via a computer network. The electronic message contains data representing a user identifier and a demand to delete any data records in a database that correspond to the user identifier. The server can then extract records corresponding to the user identifier from the database, replacing the user identifier in the extracted records with a random number and/or suppressing or generalizing quasi-identifiers from the extracted records, and then store the new records in a separate table. Copies of the extracted records can then be deleted from the original tables, and thus achieving on-demand anonymization of the one or more data records in the database corresponding to the user identifier.

20 Claims, 7 Drawing Sheets (51) Int. Cl.
    *G06F 16/2455*     (2019.01)
    *G06F 7/58*     (2006.01)

(56) References Cited

U.S. PATENT DOCUMENTS

| | | | |
|---|---|---|---|
| 8,355,923 | B2 | 1/2013 | Gervais et al. |
| 9,129,133 | B2 | 9/2015 | LaFever et al. |
| 9,910,902 | B1 * | 3/2018 | Kramer ............... G06F 16/2272 |
| 2004/0054807 | A1 * | 3/2004 | Harvey .................. H04L 12/56 |
| | | | 709/243 |
| 2008/0240425 | A1 | 10/2008 | Rosales et al. |
| 2011/0099616 | A1 * | 4/2011 | Mazur ................. H04L 63/0846 |
| | | | 726/7 |
| 2015/0007249 | A1 | 1/2015 | Bezzi et al. |
| 2015/0213458 | A1 | 7/2015 | Wolniewicz |
| 2016/0306999 | A1 | 10/2016 | Beinhauer et al. |
| 2017/0364302 | A1 * | 12/2017 | Atherton ............... G06F 3/0649 |
| 2018/0232293 | A1 * | 8/2018 | Petrick ................ G06F 11/3051 |

OTHER PUBLICATIONS

"International Search Report and Written Opinion Issued in PCT Application No. PCT/US2019/023778", dated May 9, 2019, 11 Pages.

* cited by examiner

ON-DEMAND DE-IDENTIFICATION OF DATA IN COMPUTER STORAGE SYSTEMS

BACKGROUND

Companies, organizations, education institutions, and other entities can often retain a large amount of data in computer storage systems. For example, a company can retain data of current and former employees as well as data of customers. Such data are typically stored in internal storage servers as individual database records. The computer storage servers can also provide facilities for querying the stored data based on suitable criteria and analyzing the stored data via aggregation, pattern recognition, or other suitable techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Information privacy or data privacy generally refers to a relationship between collection, retention, and dissemination of data and legal and political issues surrounding the foregoing activities. Data privacy concerns can exist wherever personally identifiable information or other sensitive information is collected, stored, used, and finally destroyed or deleted in digital form. Data privacy issues may arise in response to information from a wide range of sources, such as healthcare records, criminal justice investigations and proceedings, financial institutions and transactions, biological trait analysis, residence and geographic records, location-based services, and academic research.

A challenge involving data privacy is to utilize data while protecting individual privacy preferences and personally identifiable information. Certain techniques for de-identifying or anonymizing personal identifiable information suffer from high processing and/or maintenance costs. For example, personal identifying information (e.g., employee numbers, names, social security numbers, etc.) in a dataset can be hashed with additional random data generally referred to as "salt." The hashed personal identifying information can then be stored in the dataset while the original records are deleted. As such, records in the dataset can be de-identified. Such a technique, however, may cause inadvertent privacy leaks if a hashing function is not selected correctly. Incorrectly selecting the hashing function can expose data anonymization strategy to an attacker. The attacker can then reverse engineer the anonymized data using the hashing function to derive original data and thus causing privacy leaks. The foregoing technique can also have high maintenance costs for maintaining suitable hashing functions used for hashing the records. For example, to ensure anonymization of data, a user identifier cannot be simply hashed because the hashed value would be the same for the same user identifier. As such, one unique user identifier is replaced with another, which may be used to identify the user. To prevent such correspondence, a random salt may be injected to the hashing process to ensure the hashed user identifier is not linked to a natural person. Rotating or otherwise managing the random salt for the hashing process can lead to high maintenance costs.

Several embodiments of the disclosed technology are directed to an on-demand de-identification technique configured to perform an anonymization process on certain records of a dataset in a storage system upon demand from users corresponding to the records. Unlike other techniques, the anonymized records can be stored in a new and separate de-identified dataset as retained data. As such, at least some of the data from the original dataset can be retained while complying with data privacy laws and requirements. Suitable data analysis can then be performed on the retained data via, for instance, aggregation or pattern recognition, while data privacy is protected.

In one embodiment, a de-identification server can be configured to receive, for example, via periodical queries of a request queue, one or more deletion requests from users. The deletion requests can contain data representing one or more user identifiers usable to uniquely identify the users. Examples of such user identifiers can include employee numbers, customer account numbers, passport numbers, social security numbers, etc. The deletion requests can also indicate to the de-identification server that the users wish to delete certain records in a collection of data or dataset that contains information linked or linkable to the users as natural persons for a given period (e.g., day, date range, etc.) from the computer storage system. In certain implementations, the dataset can be stored in a computer storage system as a set of database records that span multiple tables in a database or files in the computer storage system. In other implementations, the dataset can be stored as distributed shards hosted on different storage nodes, or stored in other suitable manners.

In response to receiving the deletion requests, the de-identification server can be configured to generate a random identifier or pseudonym for each of the users who submitted the deletion requests as a telemetry identifier (TID). In certain embodiments, the de-identification server can include a cryptographically secure random number generator that is configured to generate globally unique identifiers (GUIDs) or Universally Unique Identifiers (UUIDs), or other suitable types of random data. For example, GUIDs or UUIDs can each include a 128-bit number that is highly unlikely to repeat even without a central authority to ensure uniqueness. An example UUID can include the following string: uuid:f81d4fae-7dec-11d0-a765-00a0c91e6bf6. In other embodiments, the de-identification server can also include a hashing component that is configured to generate a random identifier by hashing the corresponding user identifiers with random salts. In further embodiments, the de-identification server can be configured to generate the random identifiers or pseudonyms in other suitable manners. In certain implementations, the de-identification server can be configured to generate a new TID upon receiving each deletion request from the same user. As such, a single user can have multiple different TIDs.

The de-identification server can then temporarily store the generated TIDs and user identifiers as entries in a master lookup table. In certain implementations, the received deletion requests from the users can be processed once a day, an hour, or over other suitable intervals. For each unique user present in the deletion requests, a single TID can be generated and a mapping between the original user identifiers and the newly assigned TIDs can be temporarily maintained in the master lookup table. The master lookup table can then be used to identify individual records to be anonymized from one or more tables in the database. For instance, the de-identification server can be configured to query the one or more tables in the database to retrieve records of the users corresponding to the user identifiers included in the received deletion requests. For example, the de-identification server can join the tables in the database in order to find matching records using the user identifiers as matching criteria. In other examples, the tables can be queried separately using the user identifiers. The retrieved records are to be anonymized, for example, using techniques discussed below, rather than anonymizing the entire dataset, which can be impractical to implement in large databases with millions or tens of millions of records. As such, the remaining records in the one or more tables of the database can be intact.

Upon retrieving the records from the tables, the de-identification server can be configured to consistently replace the user identifiers in the retrieved records with the generated TIDs corresponding to the user identifiers in the master lookup table, and store the records with the TIDs in one or more new tables individually referred to herein as a retention table. As such, a given deletion request can have the same TID during the anonymization process. In other embodiments, the deletion requests may be processed less frequently (e.g., over a week, a month, etc.) than over a day or hour. Such long processing intervals may result in less variations in a number of TIDs assigned to a single user identifier. At the same time, the de-identification server can remove, obfuscate, or suppressed any quasi-identifiers that may be used for "fingerprinting" a user. A quasi-identifier generally refers to a subset of attributes in a table that are not themselves unique identifiers but can be sufficiently correlated with an individual such that a combination of the attributes can create a unique identifier. Example quasi-identifiers can include, for example, IP addresses, geolocation information (e.g., zip codes), and application session IDs. Example de-identification techniques of quasi-identifiers can include suppression and generalization. Suppression involves removing values of the quasi-identifiers (e.g., application session IDs) from a de-identified dataset. Generalization involves generalizing the values to cover a broader range or to apply to a larger category by, for example, zeroing out last two octets from IP addresses, or generalizing zip codes to a country.

The de-identification server can also be configured to persist the one or more retention tables with the anonymized records to a suitable location in the computer storage system and delete the retrieved records in the original tables that resulted in matches with the user identifiers in the deletion requests. In certain implementations, the one or more retention tables can have different retention and access control policies than the original tables. In other implementations, the retention tables can have the same retention and/or access control policies as at least one of the original tables. In one embodiment, one retention table can be maintained per an original table, and the retention table can implement at least some of the data schema of the original table minus the suppressed quasi-identifiers (if any). In other embodiments, a single unstructured retention table can be maintained for all original tables. The unstructured retention table can have a data schema that is agnostic to store all the anonymized data for the entire data collection or dataset. In further embodiments, the de-identification server can also maintain a retention table per an original table, and the retention table is also partitioned by recurrence in which deletion requests are processed, e.g., per day, hour, etc., to efficiently track when a given group of records in the original table are anonymized.

By storing the anonymized records in the one or more retention tables, the anonymization process would not affect the data schema used in the original tables. As such, the anonymization process would not cause or incur additional costs for re-programming or other operational changes to the original tables. For example, a data field in the original tables containing the user identifiers may only allow integer numbers. However, the TIDs generated for the retrieved records may contain alphanumerical strings. As such, replacing the user identifiers with the TIDs in the original tables involves re-programming the original tables to allow the data field to accept alphanumerical strings. Such re-programming can add costs and cause unforeseen operational difficulties. Thus, by avoiding such re-programming, several embodiments of the disclosed technology can have low operational impact to existing infrastructure in the computer storage system and also mitigate risks of potentially impacting upstream computing systems that depend on the original tables.

The de-identification server can also be configured to purge the temporary master lookup table containing entries of user identifiers and corresponding TIDs upon completion of anonymizing the retrieved records. As such, the only way to link the random TIDs with the original user identifiers or personally identifiable information is removed. In one embodiment, the master lookup table can be temporarily persisted on a persistent storage device (e.g., a hard disk drive). In other embodiments, the master lookup table can be maintained generally completely in memory (e.g., RAM) rather than on a persistent storage device until the anonymization process is complete. As such, a risk of a potential privacy leak can be further mitigated. In any of the foregoing embodiments, the master lookup table is purged from the computer storage system upon completion of the anonymization process.

Upon completion of the foregoing anonymization process and after purging the temporary master lookup table, the anonymized dataset stored in the retention table contains only anonymous information that is not linked or linkable to any natural persons. As such, the retention table only contains non-personal data that do not have obligations to regulations such as the General Data Protection Regulation (GDPR) promulgated by the European Union.

Several embodiments of the disclosed technology can efficiently anonymize records containing personal identifiable information. In certain embodiments of the anonymization process, no hashing operations are performed. Instead, the anonymization process involves generating a single random value, i.e., the TID, as a replacement value for the individual user identifiers in the dataset. A mapping between individual user identifiers and corresponding assigned TIDs can be stored in the master lookup table during a lifetime of the foregoing anonymization process. In addition, in other embodiments, only records targeted by the deletion requests are de-identified or anonymized and removed from the original tables and moved to the retention table on-demand. As such, several embodiments of the disclosed technology do not involve anonymizing an entire dataset, which can incur significant costs and cause operational difficulties in the original tables.

DETAILED DESCRIPTION

Certain embodiments of systems, devices, components, modules, routines, data structures, and processes for anonymization processes for computer storage systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "computer storage system" or "storage system" generally refers to an interconnected computer system having multiple network nodes that interconnect a plurality of servers or storage nodes to one another and/or to external networks (e.g., the Internet). The individual servers or storage nodes can include one or more persistent storage devices. The term "network device" generally refers to a physical network device. Example network devices include routers, switches, hubs, bridges, load balancers, security gateways, or firewalls. A "node" or "storage node" generally refers to a physical computing device configured to implement, for instance, one or more virtual machines, virtual switches, virtual disks, or other suitable virtualized components. For example, a node can include a server having a hypervisor configured to support one or more virtual storage devices, virtual machines, virtual switches or other suitable types of virtual components.

Also used herein, the term "user identifier" or "personally identifiable information" generally refers information or data that can be used on its own or with other information to uniquely identify a natural person, or to identify a natural person in context. For example, a user identifier can include an employee number, a customer account ID, a passport number, a social security number, a visa number, or other suitable numbers that uniquely identify a person. In other examples, personally identifiable information can also include data representing one or more of full names, faces, home addresses, email addresses, national identification numbers, vehicle registration numbers, driver's license numbers, fingerprint or handwriting, credit card numbers, digital identities, dates of birth, birthplace, genetic information, telephone numbers, login names, screen names, nicknames, or handles. Additional examples of user identifiers or personally identifiable information are also described later with reference to FIGS. 1-5.

Further used herein, "de-identification" or "anonymization" refers to a process that removes any user identifiers or personally identifiable information from one or more records in a database. As described in more detail below, after de-identification, a new record can be generated to contain only anonymized data that cannot be used to uniquely identify a natural person. Example of such anonymized data can include usage data (e.g., bandwidth consumed), spending data (e.g., credit card charges per month), or other suitable types of data that cannot be used to distinguish or trace an individual's identity.

In today's World, data are collected, analyzed, and used on a colossal scale. However, data privacy concerns can exist wherever personally identifiable information or other sensitive information is collected, stored, used, and finally destroyed or deleted in digital form or otherwise. Data privacy issues may arise in response to information from a wide range of sources, such as healthcare records, criminal justice investigations and proceedings, financial institutions and transactions, biological trait analysis, residence and geographic records, location-based services, and academic research.

Further used herein, the term "data record" or "record" generally refers to a single, implicitly structured data item in a table of a database. A table can include rows and columns or fields. Each row in a table can be a record that represents a set of related data, and every record in the table has the same structure. For example, in a table that represents companies, each row or record can represent a single company. Columns of the example table can represent company name, company street address, or other suitable information.

A challenge of data privacy is to utilize such collected data while protecting individual privacy preferences and personally identifiable information. Certain techniques for de-identifying or anonymizing personal information suffer from high processing and/or maintenance costs. In one example, personal identifying information (e.g., employee numbers, names, social security numbers, etc.) in a dataset can be hashed with salt that can provide randomness to a resulting hash. The salt can be rotated to ensure the same user identifier does not always have the same hash value as a pseudonym. The hashed personal identifying information can then be stored in a dataset while the original records are deleted. As such, records in the dataset can be de-identified. Such a technique, however, can cause operational difficulties in the dataset because the de-identified records may require a data schema change in the original dataset. The foregoing technique can also have high maintenance costs for maintaining hashing functions used for hashing the records.

Several embodiments of the disclosed technology are directed to an on-demand anonymization process that can be implemented to retain at least some of the anonymized data from a dataset while complying with data privacy requirements. Unlike other techniques, the anonymized records can be stored in a separate de-identified dataset as retained data. Suitable data analysis can then be performed on the retained data via, for instance, aggregation or pattern recognition, while data privacy is protected, as described in more detail below with reference to FIGS. 1-5.

Figure 1:
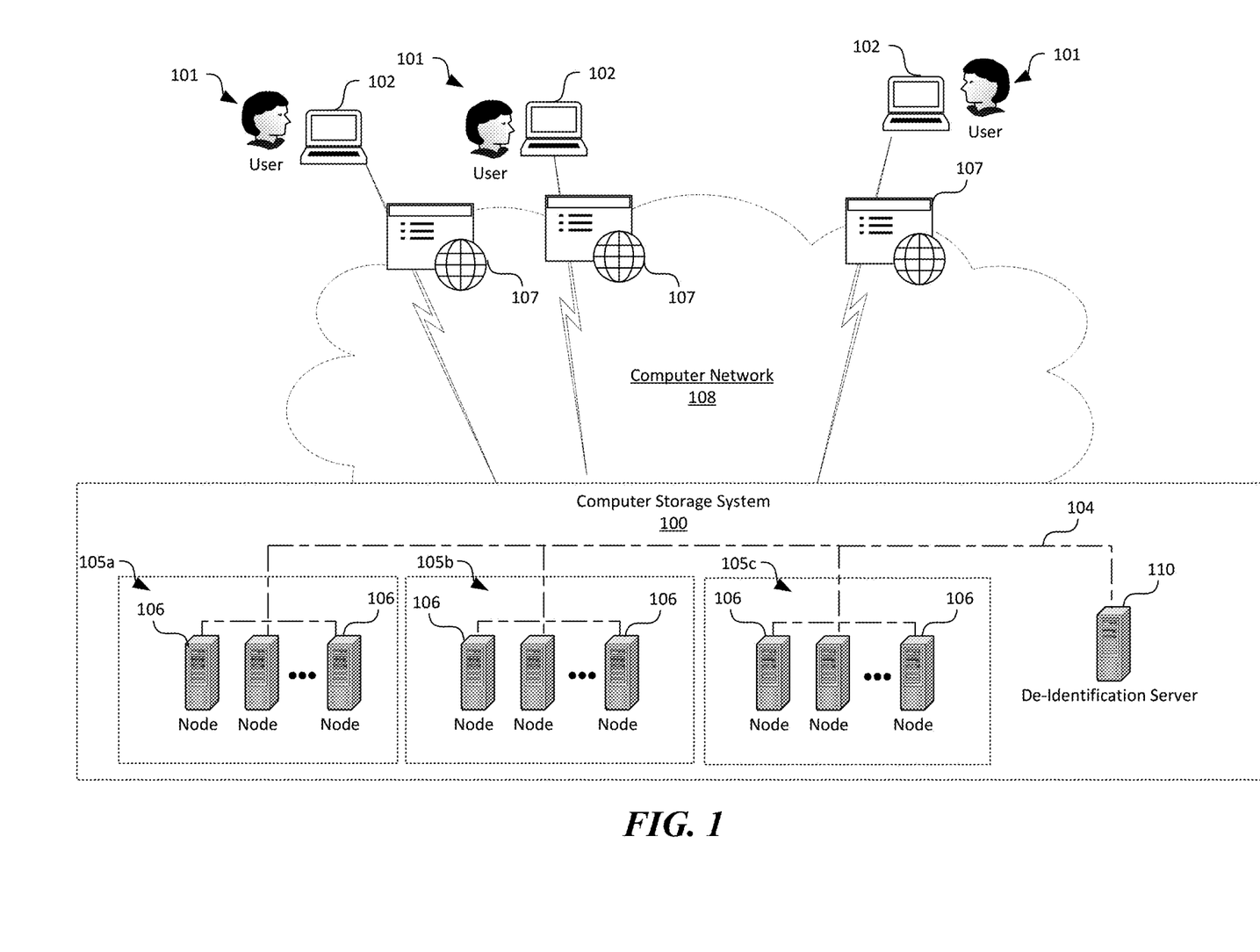
FIG. 1 is a schematic diagram illustrating a computer storage system implementing an anonymization process in accordance with embodiments of the disclosed technology.

FIG. 1 is a schematic diagram of a computer storage system 100 configured for on-demand anonymization of user records in accordance with embodiments of the disclosed technology. As shown in FIG. 1, the computer storage system 100 can be interconnected to a plurality of users 101 via client devices 102 via a computer network 108. Even though particular components of the computer storage system 100 are shown in FIG. 1, in other embodiments, the computer storage system 100 can also include additional and/or different constituents. For example, the computer storage system 100 can include additional computing devices, network storage devices, utility infrastructures, and/or other suitable components.

The client devices 102 can each include a computing device that facilitates corresponding users 101 to access computing services provided by the computer storage system 100 via the computer network 108. For example, the users 101 can utilize corresponding webpages 107 provided by the client devices 102 to submit deletion request 105, as described in more detail below with reference to FIGS. 2A-2C. In the illustrated embodiment, the client devices 102 individually include a desktop computer. In other embodiments, the client devices 102 can also include laptop computers, tablet computers, smartphones, or other suitable computing devices. Even though three users 101 and corresponding client devices 102 are shown in FIG. 1 for illustration purposes, in other embodiments, the computer storage system 100 can facilitate any suitable number of users 101 to access computing services provided by the computer storage system 100.

The computer network 108 can include one or more network devices (not shown) that interconnect the client devices 102 of the users 101 and components of the computer storage system 100. Examples of the network devices can include routers, switches, firewalls, load balancers, or other suitable network components. In one embodiment, the computer network 108 includes the Internet. In other embodiments, the computer network 108 can also include a local area network, a wide area network, a virtual private network, or other suitable types of computer network.

Also shown in FIG. 1, the computer storage system 100 can include multiple nodes 106 and a de-identification server 110 operatively coupled to one another via a system network 104. In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to one another via the system network 104. Even though three computing clusters 105 are shown in FIG. 1 for illustration purposes, in other embodiments, the computer storage system 100 can include one, two, eight, sixteen, or any other suitable numbers of computing clusters 105 with similar or different components and/or configurations.

The de-identification server 110 can be configured to anonymize data records of users 101 stored in the computer storage system 100 upon request from the users 101. In certain embodiments, the de-identification server 110 can include one or more stand alone computing devices interconnected to the nodes 106. In other embodiments, the de-identification server 110 can be one or more of the nodes 106. In further embodiments, the de-identification server 110 can include one or more computing services provided by one or more of the nodes 106. Example components and operations of the de-identification server 110 are described below in more detail with reference to FIGS. 2A-2C.

In operation, the users 101 can request the computer storage system 100 to delete any data records containing user identifiers or personal identifiable information that particularly identify the users 101 by, for example, submitting deletion requests 111 (shown in FIG. 2A) via the webpages 107 using the client devices 102. In one example, the user identifiers can include passport numbers, social security numbers, or other suitable identifiers that uniquely identify a natural person. In another example, the user identifiers can also include authenticatable identifiers that can be "authenticated" against particular users 101 or prove that the identifier belongs to an identifiable natural person. In a further example, the user identifiers can include identifiers that are not spoofable. Example of such user identifiers can include fingerprints, retina scans, or other suitable biometric measurements that can be attributed to a particular natural person. In yet a further example, the user identifiers can also include device identifications (e.g., IP addresses, MAC addresses, etc.) that are not spoofable but instead attributable to an authenticated natural person. In response to receiving the deletion requests 111, the de-identification server 110 can identify any data records containing user identifiers in the computer storage system 100. Upon identifying the data records according to the deletion requests 111, the de-identification server 110 can also anonymize the identified data records, as described in more detail below with reference to FIGS. 2A-2C.

Figure 2A:
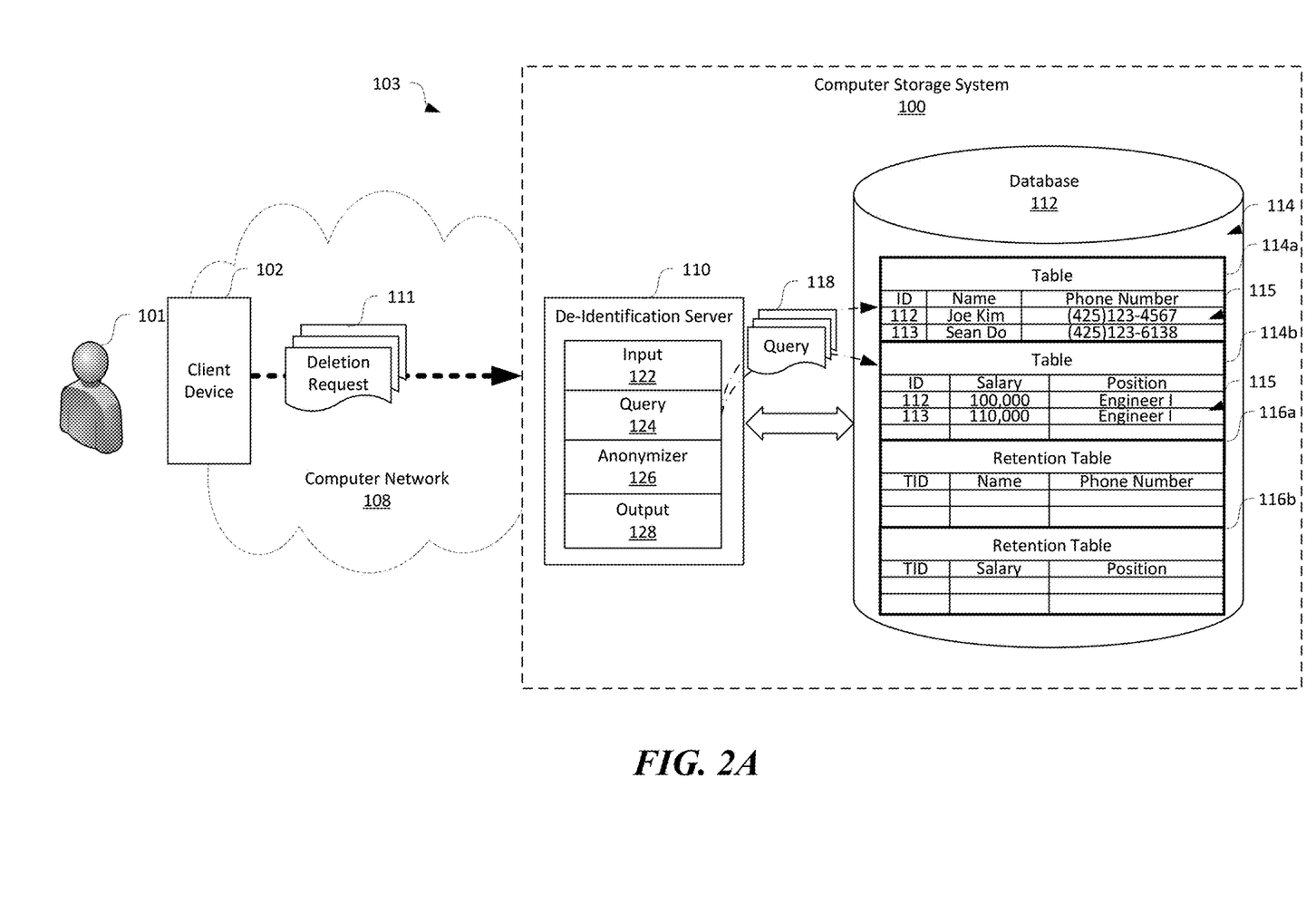
FIGS. 2A-2C are schematic diagrams illustrating certain hardware/software components of the computer storage system of FIG. 1 during an anonymization process in accordance with embodiments of the disclosed technology.
Figure 2B:
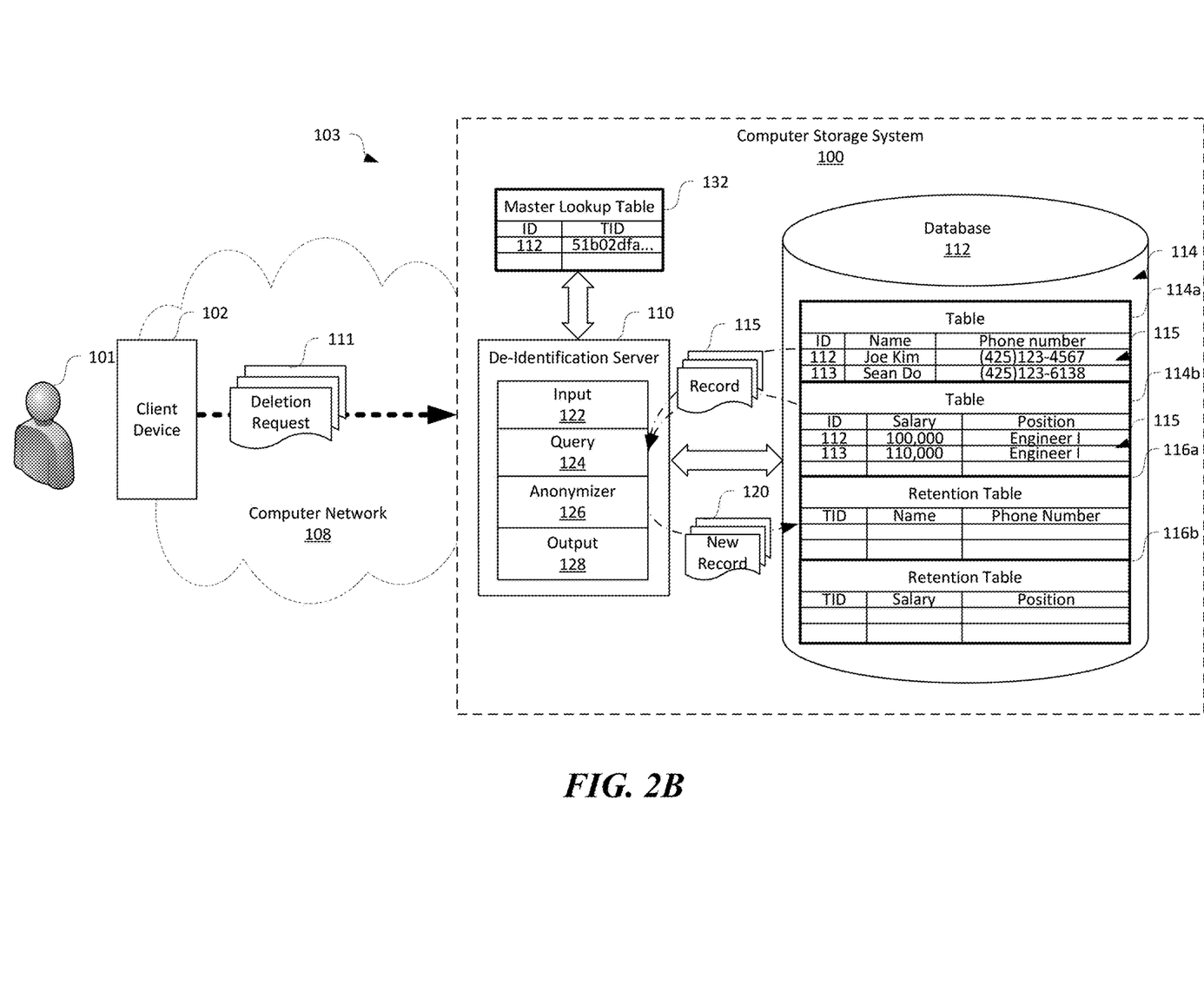
Figure 2C:
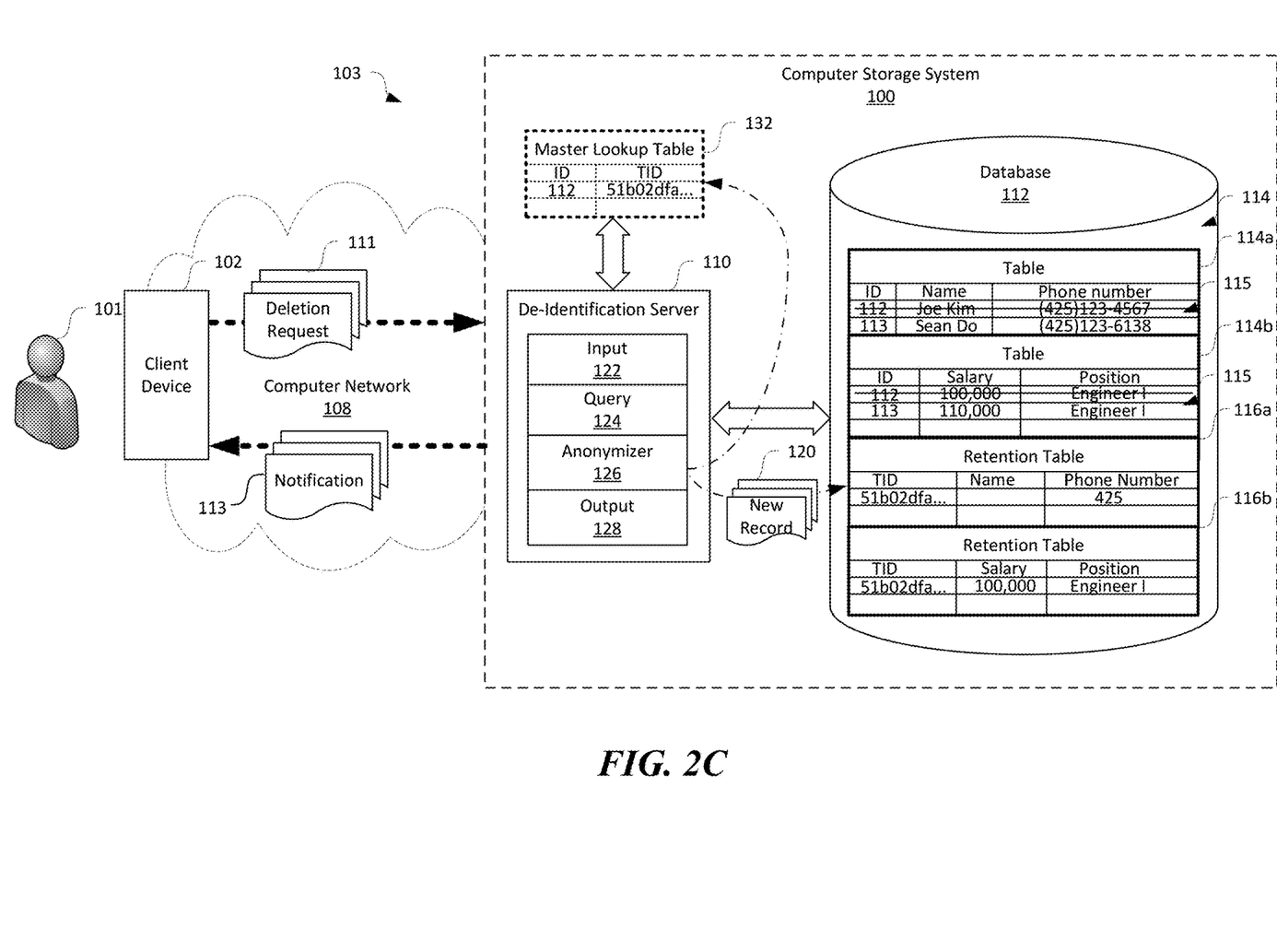

FIGS. 2A-2C are schematic diagrams illustrating certain hardware/software components of the computer storage system of FIG. 1 during an anonymization process in accordance with embodiments of the disclosed technology. In FIGS. 2A-2C, only certain components of the computer storage system 100 are shown for illustration purposes. Other components, such as the nodes 106 in FIG. 1 are not shown for clarity.

In addition, in FIG. 2A and in other Figures herein, individual software components, objects, classes, modules, and routines may be a computer program, procedure, or process written as source code in C, C++, C#, Java, SQL, U-SQL, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the user 101 can submit or otherwise transmit an electronic message representing a deletion request 111 to the computer storage system 100.

The deletion request 111 can contain data representing a user identification corresponding to the user 101. For example, the user identification can include an employee number, a customer number, a subscriber number, or other suitable types of user identifier. In certain implementations, the computer storage system 100 or components thereof can provide a webpage 107 (FIG. 1) that can be displayed in the client device 102 for submitting the deletion request 111. In other embodiments, the deletion request 111 can include an email message or other suitable types of electronic message.

Also shown in FIG. 2A, the de-identification server 110 can be operatively coupled to a database 112 in the computer storage system 100. The database 112 can be hosted on one of the nodes 106 in FIG. 1 or be maintained in the computer storage system 100 in a distributed manner, e.g., on multiple nodes 106. As shown in FIG. 2A, the database 112 can include multiple tables 114 each containing multiple data records in rows or columns. In the illustrated example, the database 112 can include first and second tables 114a and 114b each containing different data records 115. For instance, the first table 114a can contain multiple data records 115 having an "ID" field, a "Name" field, and a "Phone number" field. One example data record 115 from the first table 114a contains "112" in the ID field, "Joe Kim" in the Name field, and "(425)123-4567" in the phone number field. The Name and Phone Number fields may contain data referred to as alternative identifiers and can be either removed (e.g., names) or de-identified by removing less significant bytes (e.g., phone numbers can be mapped to area codes only). The second table 114b can contain multiple data records 115 having an "ID" field, a "Salary" field, and a "Position" field. One example data record 115 from the second table 114b contains "112" in the ID field, "100,000" in the salary field, and "Engineer I" in the position field. The database 112 can also include one or more retention tables 116 (shown as first and second retention tables 116a and 116b, respectively) configured to contain anonymized data records upon receiving the deletion request 111, as described in more detail below. In the illustrated embodiment, each table 114 can have a corresponding retention table 116 with generally similar data schema. In other embodiments, the database 112 can maintain a single unstructured retention table 116 for all the tables 114. In further embodiments, the database 112 can include a retention table 116 per original table 114 that is also partitioned by recurrence in which deletion requests 111 are processed, e.g. per day, to efficiently track when a given group of records 115 in the original tables 114 are anonymized.

Also shown in FIG. 2A, the de-identification server 110 can include an input component 122, a query component 124, an anonymizer 126, and an output component 128 operatively coupled to one another to perform an anonymization process. Even though certain components of the de-identification server 110 are shown in FIG. 2A, in other embodiments, the de-identification server 110 can also include additional and/or different components. For example, the de-identification server 110 can also include a statistic component (not shown) configured to track a number of data records 115 that are anonymized in a period of time.

The input component 122 can be configured to receive and pre-process the deletion request 111. For example, the input component 122 can be configured to authenticate the user 101 before accepting the received deletion request 111 as a valid request. In another example, the input component 122 can also be configured to verify a format, content, or other characteristics of the received deletion request 111. In further embodiments, the input component 122 can be configured to store the deletion request 111 in a request queue, stack, table, or other suitable data structure (not shown) in the de-identification server 110 await processing. Upon completion of pre-processing, the input component 122 can forward the deletion request 111 to the query component 124.

The query component 124 can be configured to query the tables 114 in the database 112 for any data records 115 containing the user identifier in the received deletion request 111. For instance, in one implementation, the query component 124 can be configured to join the first and second tables 114a and 114b and search for any data records according to a value in the ID field. For example, the query component 124 can query the joined first and second table 114a and 114b for a value of "112" in the ID field, or "Joe Kim" in the name field. In other implantations, the query component 124 can be configured to query the first and second tables 114a and 114b separately using the user identifier in the deletion request 111 and then join the resulting data records 115. In further implementations, the query component 124 can be configured to locate the data records 115 containing the user identifier via other suitable techniques. In the illustrated example, the resulting data records 115 can be as follows:

| ID  | Name    | Phone number   |
| --- | ------- | -------------- |
| 112 | Joe Kim | (425)123-4567  |
| ID  | Salary  | Position       |
| 112 | 100,000 | Engineer I     |

The query component 124 can then forward the resulting data records 115 to the anonymizer 126 for anonymization.

As shown in FIG. 2B, the anonymizer 126 can be configured to generate a random reference number such as a globally unique identifier (GUID) or Universally Unique identifier (UUID) for the user 101 who submitted the deletion request 111 as a telemetry identifier (TID), and temporarily store the generated TID and user identifiers as entries in a master lookup table 132. For instance, in the illustrated example, the random reference number can include a GUID such as "51b02dfa-9893-40e2-b253-3f2622c998b4" created to correspond to a value "112" for ID. Only the first portion of the example GUID ("51b02dfa . . . ") is shown in FIGS. 2B and 2C due to space constraints. In other examples, the TID can include integers, floating point numbers, or other suitable random numbers or strings. In further embodiments, the TID can also have a format prefix before a random number, such as a format prefix "gdpr" in "gdpr:51b02dfa . . . ". In certain embodiments, the anonymizer 126 can include a cryptographically secure random number generator (not shown) that is configured to generate the TID. In other embodiments, the anonymizer 126 can also include a hashing module (not shown) that is configured to generate the GUIDs by hashing the corresponding user identifiers (e.g., "112") with or without salts. In further embodiments, the anonymizer 126 can be configured to generate the GU IDs in other suitable manners.

In certain embodiments, the master lookup table 132 can be a temporary table maintained generally completely in a system memory 306 (shown in FIG. 5) of the de-identification server 110. In other embodiments, the master lookup table 132 can also be temporarily stored in a removable storage 336 (shown in FIG. 5) or non-removable storage 338

Figure 5:
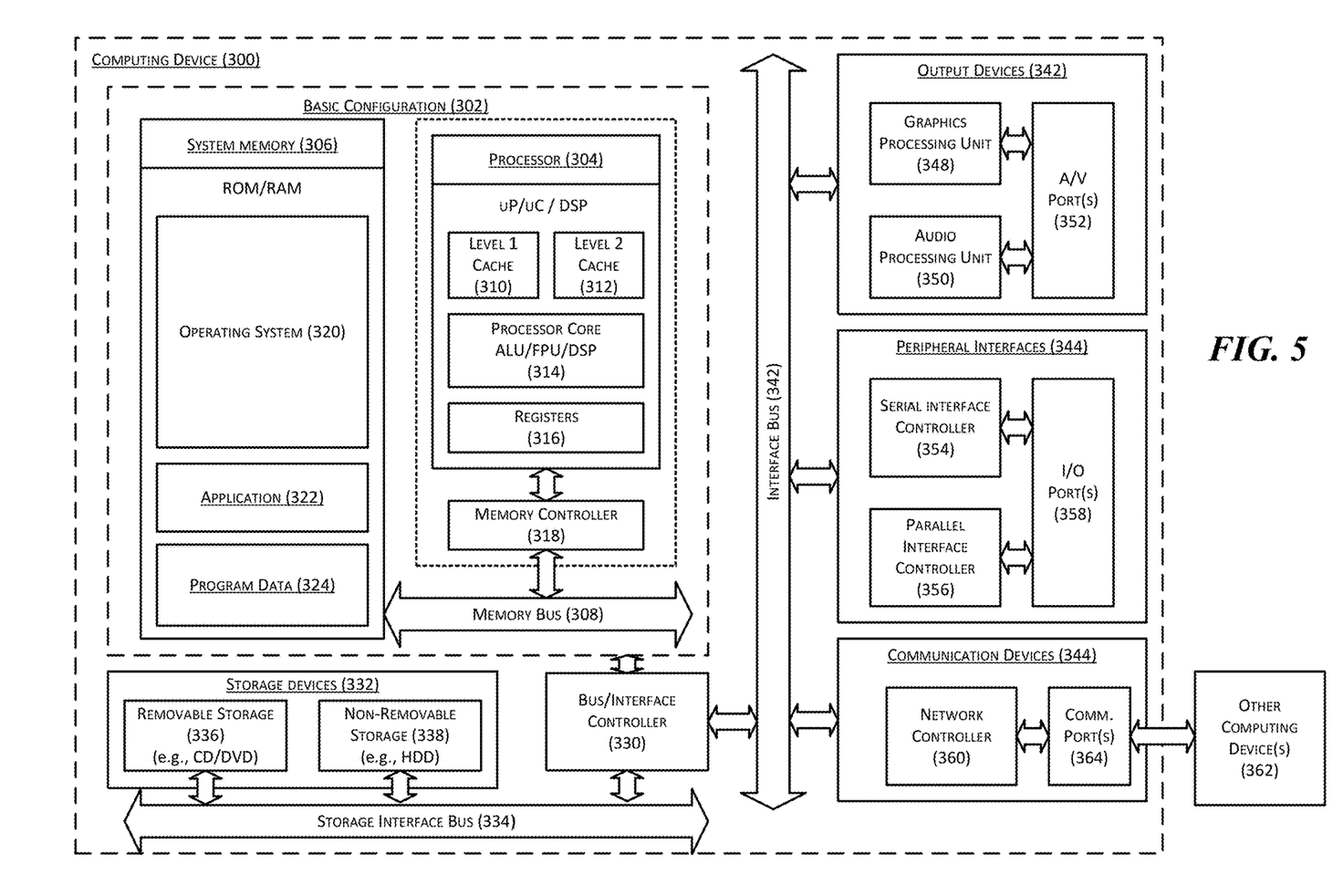
FIG. 5 is a computing device suitable for certain components of the computer storage system in FIG. 1.

(shown in FIG. 5). As described in more detail below, upon completion of the anonymization process, the mater lookup table 132 can be deleted, overwritten, or otherwise purged from the system memory 306, the removable storage 336, and/or the non-removable storage 338.

Upon receiving the data records 115 from the query component 124, the anonymizer 126 can be configured to replace the user identifiers in the data records 115 with the generated TID. For instance, in the example shown above, the ID field value of "112" can be replaced with the generated TID "51b02dfa-9893-40e2-b253-3f2622c998b4" as follows:

| ID | Name | Phone number |
|---|---|---|
| 51b02dfa-9893-40e2-b253-3f2622c998b4 | Joe Kim | (425)123-4567 |

| ID | Salary | Position |
|---|---|---|
| 51b02dfa-9893-40e2-b253-3f2622c998b4 | 100,000 | Engineer I |

At the same time, the anonymizer 126 can also remove or obfuscate any quasi-identifiers that may be used for "fingerprinting" the user 101. A quasi-identifier generally refers to a subset of attributes in a table 114 that are not themselves unique identifiers but can be sufficiently correlated with an individual such that a combination of the attributes can create a unique identifier. In the illustrated example, "Joe Kim" can be removed (shown as stricken through) and "(425)123-4567" can be de-identified by, for instance, removing less significant bytes to map the phone number to an area code only to generate anonymized new data records 120 as follows:

| ID | Name | Phone number |
|---|---|---|
| 51b02dfa-9893-40e2-b253-3f2622c998b4 | ~~Joe Kim~~ | 425 |

| ID | Salary | Position |
|---|---|---|
| 51b02dfa-9893-40e2-b253-3f2622c998b4 | 100,000 | Engineer I |

The various quasi-identifiers can be configured by an administrator (not shown) of the computer storage system 110, selected according to certain laws and/or regulations, or derived via other suitable sources. In other embodiments, the phone number can also be removed.

As shown in FIG. 2C, once the anonymized new data record 120 is generated, the anonymizer 126 can be configured to store or persist the new data record 120 in the corresponding retention tables 116. For example, the anonymized data record from the first table 114a can be stored in the first retention table 116a while that from the second table 114b can be stored in the second retention table 116b. The anonymizer 126 can also be configured to delete the retrieved data records 115 in the original tables 114a and 114b that resulted in matches with the user identifiers in the deletion request 111. For instance, as shown in FIG. 2C, the data records 115 for user having an ID of "112" are both deleted from the first and second tables 114a and 114b, as shown being stricken through.

In certain implementations, the retention tables 116 can have different retention and access control policies than the corresponding original tables 114. For example, data in the retention tables 116 can be retained for an indefinite amount of time while data in the original tables 114 can be retained for 30 days, 60 days, or other finite amount of time. In another example, only certain authorized personnel (e.g., administrators) can have access to the retention tables 116 while the original tables 114 are available to general users 101. In other implementations, the retention tables 116 can have the same retention and/or access control policies as at least one of the original tables 114.

By storing the anonymized new data records 120 in the retention table 116, data schema used in the original tables 114 can be unaffected by the anonymization process. As such, the foregoing anonymization process would not cause or incur additional costs for programming or other operational changes to the original tables 114. In the example discussed above, the ID data field containing the user identifiers may only allow integers in the original tables 114. However, the TID generated for the retrieved data records 115 contains an alphanumerical string. In another example, data fields deemed quasi-identifiers in the original tables 114 may be initially configured to not accept NULLs or empty values. However, the foregoing anonymization process may suppress such quasi-identifiers by introducing invalid values (e.g., NULLs) to the original tables 114. As such, replacing the user identifier with the TID and suppressing quasi-identifiers in the original tables 114 may involve programming changes to the original tables 114. By avoiding such changes, several embodiments of the disclosed technology can have low operational impact to existing infrastructure in the computer storage system 100.

In certain embodiments, the anonymizer 126 can also be configured to apply additional anonymization techniques at a different processing stage to further obfuscate the data in the retention table 116 and thus achieving a higher degree of privacy. For example, the anonymizer 126 can also be configured to suppress additional attributes or generalize their values by, for instance, binning the values in the salary field. In other examples, the anonymizer 126 can also be configured to inject "noise" data into the dataset. In any of these embodiments, the anonymizer 126 can also be configured to apply various data anonymization strategies as a secondary process to achieve a desired level of privacy for certain specific datasets.

As shown in FIG. 2C, the anonymizer 126 can also be configured to delete or purge the temporary master lookup table 132 containing entries of user identifiers and corresponding TIDs. The deleted master lookup table 132 is shown in phantom lines for clarity. As such, the only way to link the random TID with the original user identifier or personally identifiable information is removed. As such, the resulting dataset stored in the retention table 116 contains only anonymous information that is not linked or linkable to any natural persons. For example, the new data record 115 shown above does not contain any data that can be used to identify the original user 101. As such, the retention table 116 only contains non-personal data that do not have obligations to regulations such as the GDPR promulgated by the European Union.

Several embodiments of the disclosed technology can efficiently anonymize data records 115 containing personal identifiable information. In certain embodiments of the anonymization process, no hashing operations are performed. Instead, the anonymization process involves generating a single random value, i.e., the TID, as a replacement value for the individual user identifiers to reduce risks of inadvertent privacy leaks when a hashing function is not properly selected and/or configured. For example, when a hashing function is not properly selected, data anonymization strategy may be exposed to an attacker. The attacker can then reverse engineer the anonymized data to derive original data and causing privacy leaks. In addition, the only records targeted by the deletion requests 111 are de-identified or anonymized and removed from the original tables 114 to the retention table 116 on-demand. Such a feature renders the foregoing anonymization process practical to be implemented at a large scale to de-identify large collections of data. For instance, even though only two data records 115 are shown in FIGS. 2A-2B for illustration purposes, in some implementations, the database 112 can contain millions or even larger number of data records 115. To hash all user identifiers in such large number of data records 115 can incur long processing times and require a large amount of computing resources such that the database 112 may be rendered unresponsive to data access requests from the users 101. As such, by only anonymizing data records 115 on-demand, several embodiments of the disclosed technology do not involve anonymizing an entire dataset in the original tables 114, and thus saving significant costs and reducing risks of operational difficulties in the original tables 114.

Figure 3:
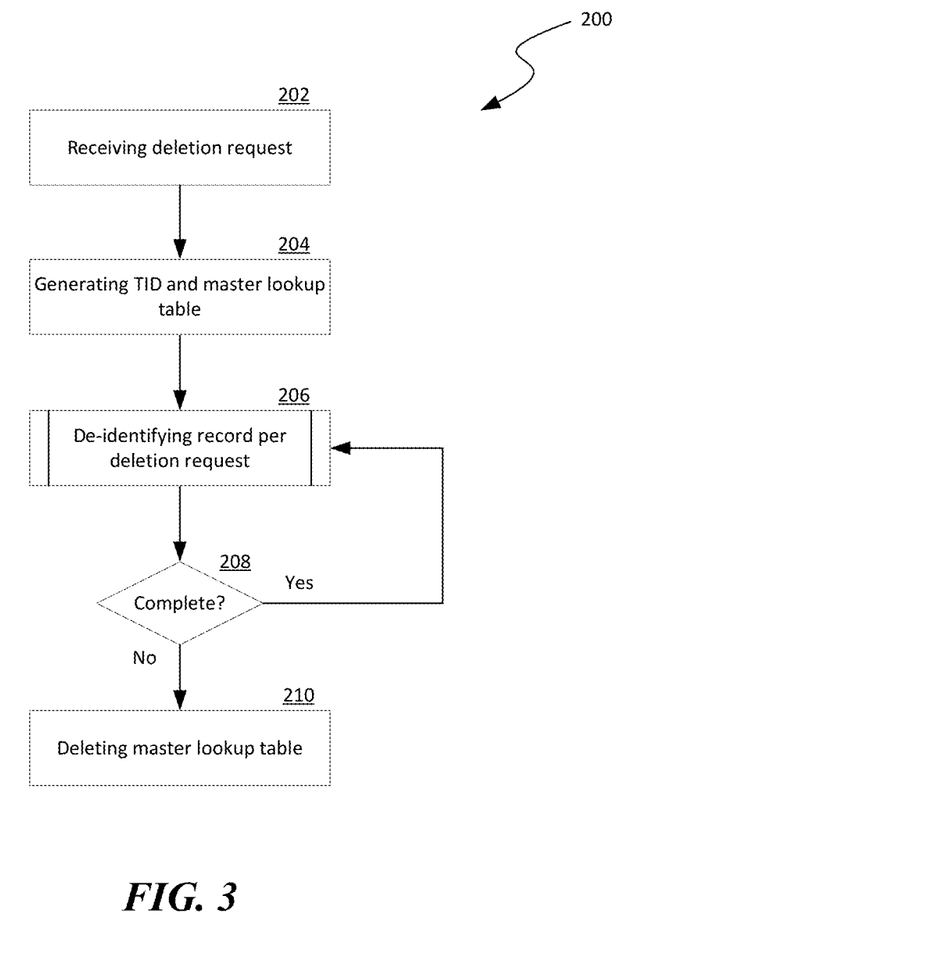
FIGS. 3 and 4 are flowcharts illustrating anonymization processes in a computer storage system in accordance with embodiments of the disclosed technology.
Figure 4:
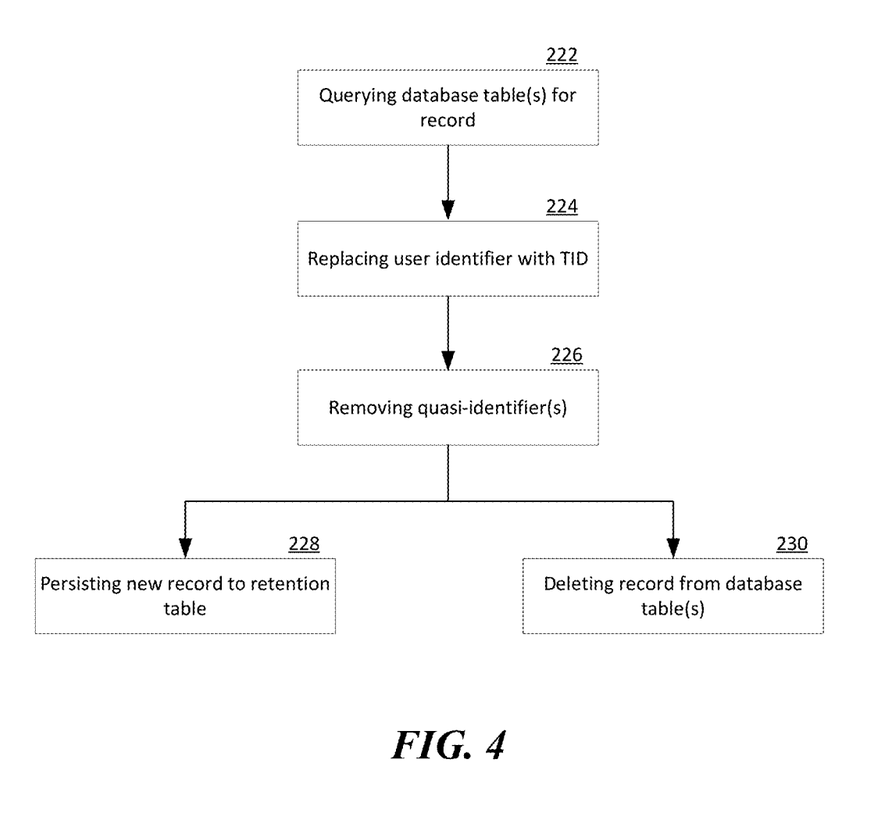

FIGS. 3 and 4 are flowcharts illustrating anonymization processes in accordance with embodiments of the disclosed technology. Even though the processes are described in the context of the computer storage system 100 in FIG. 1, in other embodiments, the processes can be implemented in other computer systems with additional and/or different components than those shown in FIG. 1. Also, particular sequence of operations are shown in FIGS. 3 and 4 for illustration purposes only. In other embodiments, certain operations of the processes in FIGS. 3 and 4 can have other suitable execution sequences.

As shown in FIG. 3, an anonymization process 200 can include receiving a deletion request at stage 202. The deletion request can include data representing a user identifier and an indication from the user to delete data containing any personally identifiable information of the user. The process 200 can then include generating a random identifier or TID for the user and creating an entry containing the TID and the user identifier in a master lookup table at stage 204.

The process 200 can then include de-identifying any data records in the computer storage system 100 that contains the user identifier or other suitable personally identifiable information at stage 206. In certain embodiments, de-identifying the data records can include replacing the user identifier in the data records with the TID. In other embodiments, de-identifying the data records can also include persisting the data records with replaced TID in a retention table. Certain example operations suitable for de-identifying the data records are described in more detail below with reference to FIG. 4. The process 200 can then include a decision stage 208 to determine whether the de-identifying operation is complete. In response to determining that the de-identifying operation is complete, the process 200 can include deleting the master lookup table at stage 210.

FIG. 4 is a flow chart illustrating certain example operations for de-identifying data records. As shown in FIG. 4, the operations can include querying one or more database tables for data records using the user identifier as a criterion at stage 222. As a result of the querying, one or more data records can be retrieved from the database tables. The operations can then include replacing the user identifier in the retrieved data records with the TID or other suitable random identifier at stage 224 and removing quasi-identifier(s) at stage 226, as described above with reference to FIGS. 2A-2C. The operations can then include persisting the new data records with the replaced TID in one or more retention tables at stage 228 and deleting the retrieved data records from the original database tables at stage 230.

FIG. 5 is a computing device 300 suitable for certain components of the computer storage system 100 in FIG. 1. For example, the computing device 300 can be suitable for the nodes 106 or the de-identification server 110 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu P$), a microcontroller ($\mu C$), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 4 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated or other types of signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for de-identifying data records in a database in a computer storage system, the method comprising:
    receiving, from a user, a deletion request containing data representing a user identifier of the user and a demand to delete any data records in the database that correspond to the user identifier; and
    upon receiving the deletion request, at the computer storage system,
        generating a random identification number uniquely corresponding to the received deletion request from the user;
        querying one or more tables in the database using the user identifier as a matching criterion to retrieve one or more data records corresponding to the user identifier;
        upon retrieving the one or more data records corresponding to the user identifier, replacing the user identifier in the retrieved data records with the generated random identification number; and
        deleting copies of the retrieved one or more data records from the one or more tables in the database in response to the received deletion request and persisting the data records with the user identifier replaced with the random identification number in a retention table separate from the one or more tables in the database, thereby achieving on-demand anonymization of the data records in the database corresponding to the user identifier.

2. The method of claim 1 wherein querying one or more tables also includes:
    querying the one or more tables in the database using the user identifier as a matching criterion to retrieve the one or more data records corresponding to the user identifier and subsequently, delete the one or more data records from the one or more tables in the database.

3. The method of claim 1 wherein generating the random identification number also includes:
    generating the random identification number using a random number generator to generate a globally unique identifier as the random identification number; and
    storing the generated globally unique identifier and the user identifier received in the deletion request as an entry in a master lookup table in the computer storage system.

4. The method of claim 1 wherein generating the random identification number also includes:
    generating the random identification number using a hash function to hash the user identifier with additional random data; and
    storing the generated random identification number and the user identifier received in the deletion request as an entry in a master lookup table in the computer storage system.

5. The method of claim 1 wherein generating the random identification number also includes:
    generating the random identification number by encrypting the user identifier; and
    storing the generated encrypted user identifier and the user identifier as received in the deletion request as an entry in a master lookup table in the computer storage system.

6. The method of claim 1, further comprising:
    upon receiving the deletion request, at the computer storage system,
        storing the generated random identification number and the user identifier received in the deletion request as an entry in a master lookup table in the computer storage system; and
        subsequent to persisting the data records with the user identifier replaced with the random identification number in the retention table, deleting the master lookup table from the computer storage system.

7. The method of claim 1, further comprising:
    upon receiving the deletion request, at the computer storage system,
        storing the generated random identification number and the user identifier received in the deletion request as an entry in a master lookup table maintained in a volatile memory of a server in the computer storage system; and subsequent to persisting the data records with the user identifier replaced with the random identification number in the retention table, purging the master lookup table from the memory of the server in the computer storage system.

8. The method of claim 1 wherein:

the retrieved data records contain one or more quasi-identifiers in data fields containing attributes usable to identify the user in a correlated manner; and the method further includes obfuscating values of the one or more quasi-identifiers before persisting the data records in the retention table.

9. The method of claim 1 wherein:

the one or more tables in the database have a corresponding first set of access and retention policies; and the method further includes assigning a second set of access and retention policies to the retention table, the second set being different than the first set of access and retention policies.

10. A computing device in a computer storage system containing a database with multiple tables, the computing device comprising:

a processor; and a memory containing instructions executable by the processor to cause the computing device to:

upon receiving a deletion request containing data representing a user identifier and a demand to delete any data records in the database that correspond to the user identifier, retrieve, from one or more tables in the database, one or more data records using the user identifier as a matching criterion;

generating a random number uniquely corresponding to the received deletion request;

anonymize the retrieved one or more data records by replacing data representing the user identifier contained in the retrieved data records with the generated random number;

persist the one or more data records with the data representing the user identifier replaced with the random number in a retention table separate from the one or more tables in the database; and delete copies of the retrieved one or more data records from the one or more tables in the database, thereby achieving on-demand anonymization of the one or more data records in the database corresponding to the user identifier.

11. The computing device of claim 10 wherein the memory contains additional instructions executable by the processor to cause the computing device to:

generate the random number via one or more of:

using a random number generator to generate a globally unique identifier as the random number;

using a hash function to hash the user identifier with additional random data; or encrypting the user identifier received in the deletion request.

12. The computing device of claim 10 wherein the memory contains additional instructions executable by the processor to cause the computing device to:

generate the random number via one or more of:

using a random number generator to generate a globally unique identifier as the random number;

using a hash function to hash the user identifier with additional random data; or encrypting the user identifier received in the deletion request; and store the generated random number and the user identifier as an entry in a lookup table maintained in the computing device.

13. The computing device of claim 10 wherein the memory contains additional instructions executable by the processor to cause the computing device to:

generate the random number via one or more of:

using a random number generator to generate a globally unique identifier as the random number;

using a hash function to hash the user identifier with additional random data; or encrypting the user identifier received in the deletion request;

store the generated random number and the user identifier as an entry in a lookup table maintained in the computing device; and upon completion of anonymizing the retrieved data records, purging the lookup table from the computing device.

14. The computing device of claim 10 wherein the memory contains additional instructions executable by the processor to cause the computing device to:

generate the random number via one or more of:

using a random number generator to generate a globally unique identifier as the random number;

using a hash function to hash the user identifier with additional random data; or encrypting the user identifier received in the deletion request;

store the generated random number and the user identifier as an entry in a lookup table maintained in the memory of the computing device; and upon completion of anonymizing the retrieved one or more data records, purging the lookup table from the memory of the computing device.

15. The computing device of claim 10 wherein the memory contains additional instructions executable by the processor to cause the computing device to:

obfuscating values of one or more quasi-identifiers before persisting the one or more data records in the retention table, the one or more quasi-identifiers including attributes in data fields of the retrieved one or more data records that are usable to identify the user in a correlated manner.

16. The computing device of claim 10 wherein:

to delete the copies of the retrieved one or more data records from the one or more tables in the database includes to delete the copies of only the retrieved one or more data records from the one or more tables in the database without affecting other data records in the one or more tables in the database.

17. A method for de-identifying data records in a database having one or more tables containing data records in a computer storage system, the method comprising:

upon receiving, from a user, a deletion request containing data representing a user identifier of the user and a demand to delete any data records in the database that correspond to the user identifier, retrieving, from the one or more tables in the database, one or more data records individually containing data representing the user identifier in the received deletion request;

anonymizing the retrieved data records by replacing data representing the user identifier in the retrieved one or more data records with a generated random identifier;

storing the anonymized one or more data records in a retention table separate from the one or more tables from which the data records are retrieved; and deleting copies of the retrieved one or more data records from the one or more tables in the database without affecting other data records in the one or more tables, thereby achieving on-demand anonymization of the one or more data records in the database corresponding to the user identifier.

18. The method of claim 17 wherein extracting the one or more data records from the one or more tables includes:

joining the one or more tables in the database; and querying the one or more tables in the database using the user identifier as a matching criterion.

19. The method of claim 17, further comprising:

storing the random number and the user identifier as an entry in a lookup table in the computer storage system; and subsequent to storing the anonymized data records in the retention table, deleting the lookup table from the computer storage system.

20. The method of claim 17 wherein:

the retrieved one or more data records contain one or more quasi-identifiers in data fields containing attributes usable to identify the user in a correlated manner; and anonymizing the retrieved data records further includes obfuscating values of the one or more quasi-identifiers before storing the anonymized one or more data records in the retention table.

* * * * *